US012531789B2

(12) United States Patent
Gajic et al.

(10) Patent No.: US 12,531,789 B2
(45) Date of Patent: Jan. 20, 2026

(54) METHOD AND APPARATUS FOR FEASIBILITY CHECKING OF AI PIPELINE TRUSTWORTHINESS

(71) Applicant: Nokia Solutions and Networks Oy, Espoo (FI)

(72) Inventors: Borislava Gajic, Munich (DE); Tejas Subramanya, Munich (DE); Henning Sanneck, Munich (DE); Janne Ali-Tolppa, Espoo (FI); Sina Khatibi, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 157 days.

(21) Appl. No.: 18/294,335

(22) PCT Filed: Aug. 11, 2021

(86) PCT No.: PCT/EP2021/072357
§ 371 (c)(1),
(2) Date: Feb. 1, 2024

(87) PCT Pub. No.: WO2023/016635
PCT Pub. Date: Feb. 16, 2023

(65) Prior Publication Data
US 2024/0348508 A1    Oct. 17, 2024

(51) Int. Cl.
*G06F 15/16* (2006.01)
*H04L 41/16* (2022.01)

(52) U.S. Cl.
CPC ................................ *H04L 41/16* (2013.01)

(58) Field of Classification Search
CPC ....................... H04L 41/16; H04L 41/5025
See application file for complete search history.

(56) References Cited

U.S. PATENT DOCUMENTS 12,294,614 B2 *   5/2025  Voit .................. H04L 63/20

FOREIGN PATENT DOCUMENTS

WO    2021/069196 A1    4/2021
WO    2022/237963 A1    11/2022

OTHER PUBLICATIONS

"Msc-generator", Sourceforge, Retrieved on Februray 16, 2024, Webpage available at :https://sourceforge.net/projects/msc-generator/.

(Continued)

*Primary Examiner* — Padma Mundur
(74) *Attorney, Agent, or Firm* — SQUIRE PATTON BOGGS (US) LLP

(57) ABSTRACT

A method, executable by a first network entity or function associated to a network, wherein the first network entity or function has an interface configured to receive information in relation to an artificial intelligence, AI, trustworthiness level from a network management entity or function associated to the network and a second network entity or function associated to the network, has an interface configured to receive information in relation to an AI service level from the network management entity or function, the method comprising communicating with the second network entity or function via an interface established between the first network entity or function and the second network entity or function.

19 Claims, 11 Drawing Sheets

(56) References Cited

OTHER PUBLICATIONS

International Search Report and Written Opinion received for corresponding Patent Cooperation Treaty Application No. PCT/EP2021/072357, dated Apr. 20, 2022, 13 pages.
"Information technology Artificial intelligence—Overview of trustworthiness in artificial intelligence", ISO/IEC TR 24028, First edition, May 2020, 49 pages.
Stanczak, FG ML5G Technical Specification "Requirements, architecture, and design for machine learning function orchestrator", ITU-T FG ML5G, SG13-TD578/WP1 Study Group 13, Jul. 20-31, 2020, 121 pages.
"SmartM2M; Artificial Intelligence and the oneM2M Architecture", ETSI TR 103 674, V0.2.0, Apr. 2020, pp. 1-29.
Toussaint et al., "Machine Learning Systems in the IoT: Trustworthiness Trade-offs for Edge Intelligence", arXiv, Dec. 1, 2020, 8 pages.
Office action received for corresponding European Patent Application No. 21758677.5, dated Nov. 20, 2024, 5 pages.
Office action received for corresponding European Patent Application No. 21758677.5, dated Jul. 3, 2025, 5 pages.

\* cited by examiner

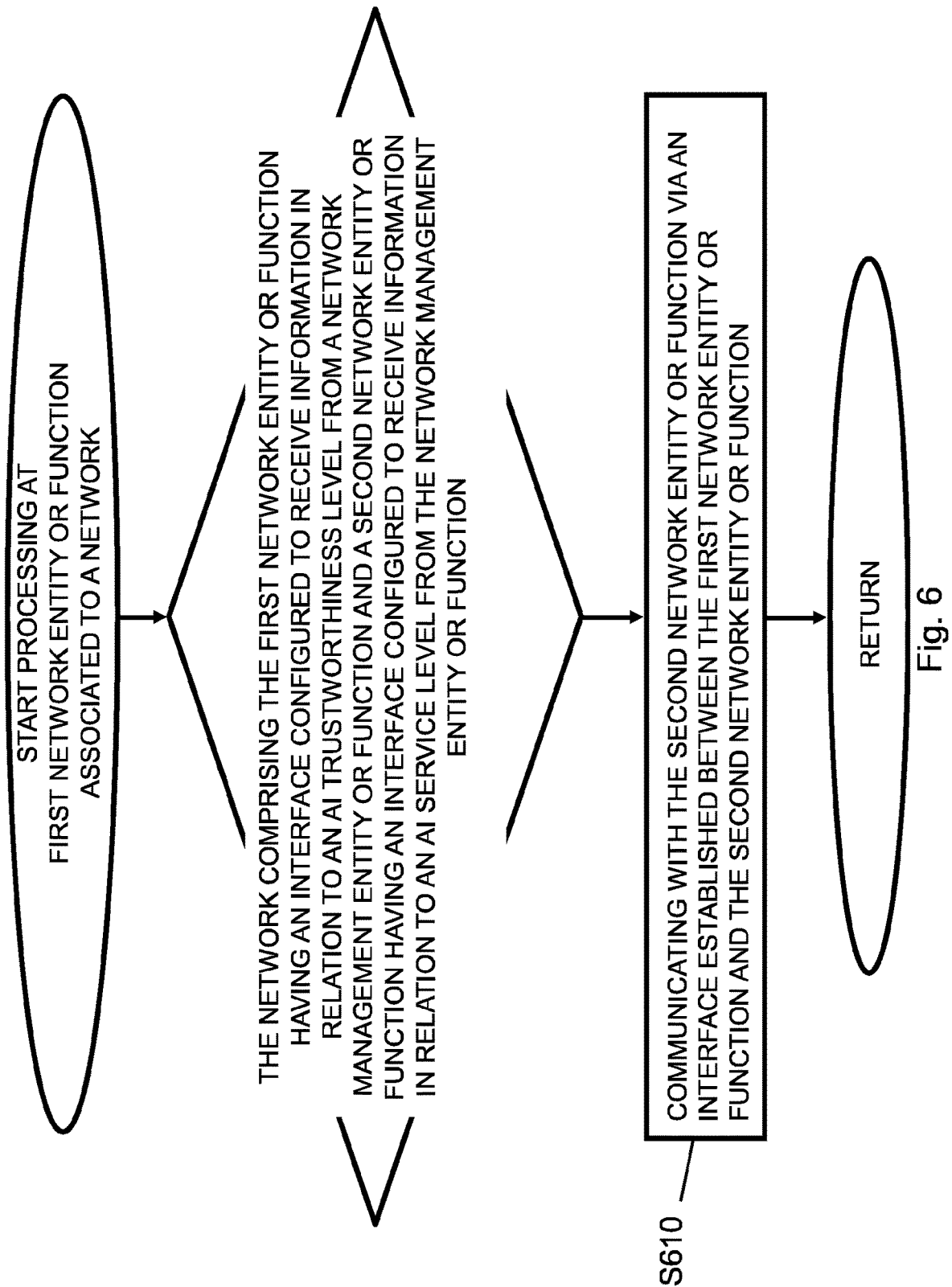

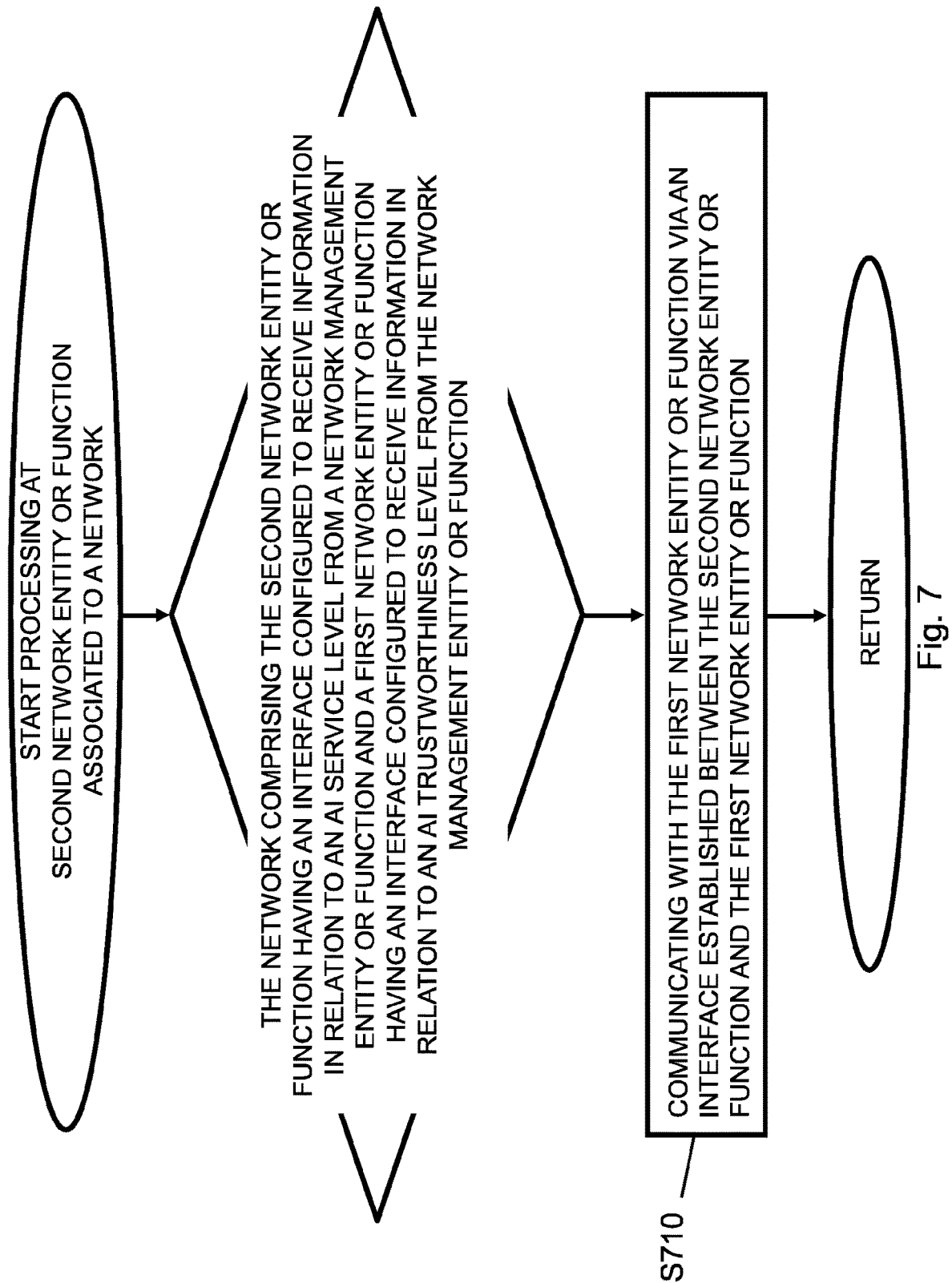

METHOD AND APPARATUS FOR FEASIBILITY CHECKING OF AI PIPELINE TRUSTWORTHINESS

RELATED APPLICATION

This application claims priority to PCT Application No. PCT/EP2021/072357, filed on Aug. 11, 2021, which is incorporated herein by reference in its entirety.

TECHNICAL FIELD

The present disclosure relates to a method and an apparatus for feasibility checking of artificial intelligence, AI, pipeline trustworthiness.

BACKGROUND ART

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments. Further, also the application/usage of Artificial Intelligence (AI)/Machine learning (ML)-related methods and models is of growing relevance/importance over the last years.

Currently, studies are ongoing to establish a new Trustworthy Artificial Intelligence Framework (TAIF) for Cognitive Autonomous Networks (CAN). Generally, the aim of such a TAIF is to facilitate the definition, configuration, monitoring and measuring of AI/ML model trustworthiness (i.e., fairness, explainability and robustness) for interoperable and multi-vendor environments. A service definition or a business/customer intent may include AI/ML trustworthy requirements in addition to the Quality of Service (QoS) requirements, and the TAIF is used to configure the requested AI/ML trustworthiness and to monitor and assure its fulfilment.

From such studies, however, it turns out that, depending on the requirements of a use case (e.g., low-latency), (parts of) the AI/ML pipeline may need to be deployed at network entities with scarce resource capabilities (e.g., edge nodes with limited memory, computation and networking). In such an environment, realizing the desired AI QoT for an AI/ML pipeline (i.e., by employing various TAI methods) without violating the desired AI QoS may result in conflicts/issues while utilizing the scarce network resources to implement various AI/ML-related methods. If such conflicts/issues are not properly managed it may lead to a drop in AI model and network performance (QoS) as well as to network instabilities. Thus, there is need for improvement.

It is therefore an object of the present disclosure to improve the prior art.

The following meanings for the abbreviations used in this specification apply:

2G Second Generation
3G Third Generation
3GPP $3^{rd}$ Generation Partnership Project
3GGP2 $3^{rd}$ Generation Partnership Project 2
4G Fourth Generation
5G Fifth Generation
5GC 5G Core
6G Sixth Generation
AI/ML Artificial Intelligence/Machine Learning
AP Access Point
API Application Programming Interface
BS Base Station
CAN Cognitive Autonomous Network
CDMA Code Division Multiple Access
CU Centralized Unit
DSL Digital Subscriber Line
EDGE Enhanced Data Rates for Global Evolution
EEPROM Electrically Erasable Programmable Read-only Memory
eNB Evolved Node B
ETSI European Telecommunications Standards Institute
gNB Next Generation Node B
GPRS General Packet Radio System
GSM Global System for Mobile communications
IE Information Element
IEEE Institute of Electrical and Electronics Engineers
IETF Internet Engineering Task Force
ISD Information Subscriber Dialing
ISDN Integrated Services Digital Network
ITU International Telecommunication Union
LTE Long Term Evolution
LTE-A Long Term Evolution-Advanced
MANETs Mobile Ad-Hoc Networks
NB Node B
QoS Quality of Service
QoT Quality of Trustworthiness
RAM Random Access Memory
ROM Read Only Memory
TAI Trustworthy Artificial Intelligence
TAIF Trustworthy Artificial Intelligence Framework
TED Teaching Explainable Decisions
TISPAN Telecoms & Internet converged Services & Protocols for Advanced Networks
UE User Equipment
UMTS Universal Mobile Telecommunications System
UWB Ultra-Wideband
WCDMA Wideband Code Division Multiple Access WiMAX Worldwide Interoperability for Microwave Access
WLAN Wireless Local Area Network

SUMMARY

Various examples of embodiments of the present disclosure aim at addressing at least part of the above issues and/or problems and drawbacks.

Various aspects of examples of embodiments of the present disclosure are set out in the appended claims and relate to methods, apparatuses and computer program products relating to feasibility checking of AI pipeline trustworthiness.

According to examples of embodiments, there is provided, for example, a method according to claim 1 and a method according to claim 12. Further advantageous developments with respect to the methods are defined in the respective dependent claims 2 to 11 and 13 to 19.

Any one of the above mentioned aspects enables a feasibility checking of AI pipeline trustworthiness, thereby allowing to solve at least part of the problems and drawbacks as identified/derivable from above.

Thus, improvement is achieved by methods, apparatuses and computer program products enabling a feasibility checking of AI pipeline trustworthiness.

BRIEF DESCRIPTION OF THE DRAWINGS

Some embodiments of the present disclosure are described below, by way of example only, with reference to the accompanying drawings, in which:

FIG. 6 shows a flowchart illustrating steps corresponding to a method executable by a first network entity or function according to various examples of embodiments;

FIG. 7 shows a flowchart illustrating steps corresponding to a method executable by a second network entity or function according to various examples of embodiments;

DESCRIPTION OF EMBODIMENTS

Basically, for properly establishing and handling a communication between two or more end points (e.g. communication stations or elements or functions, such as terminal devices, user equipments (UEs), or other communication network elements, a database, a server, host etc.), one or more network elements or functions (e.g. virtualized network functions), such as communication network control elements or functions, for example access network elements like access points (APs), radio base stations (BSs), relay stations, eNBs, gNBs etc., and core network elements or functions, for example control nodes, support nodes, service nodes, gateways, user plane functions, access and mobility functions etc., may be involved, which may belong to one communication network system or different communication network systems.

Figure 1:
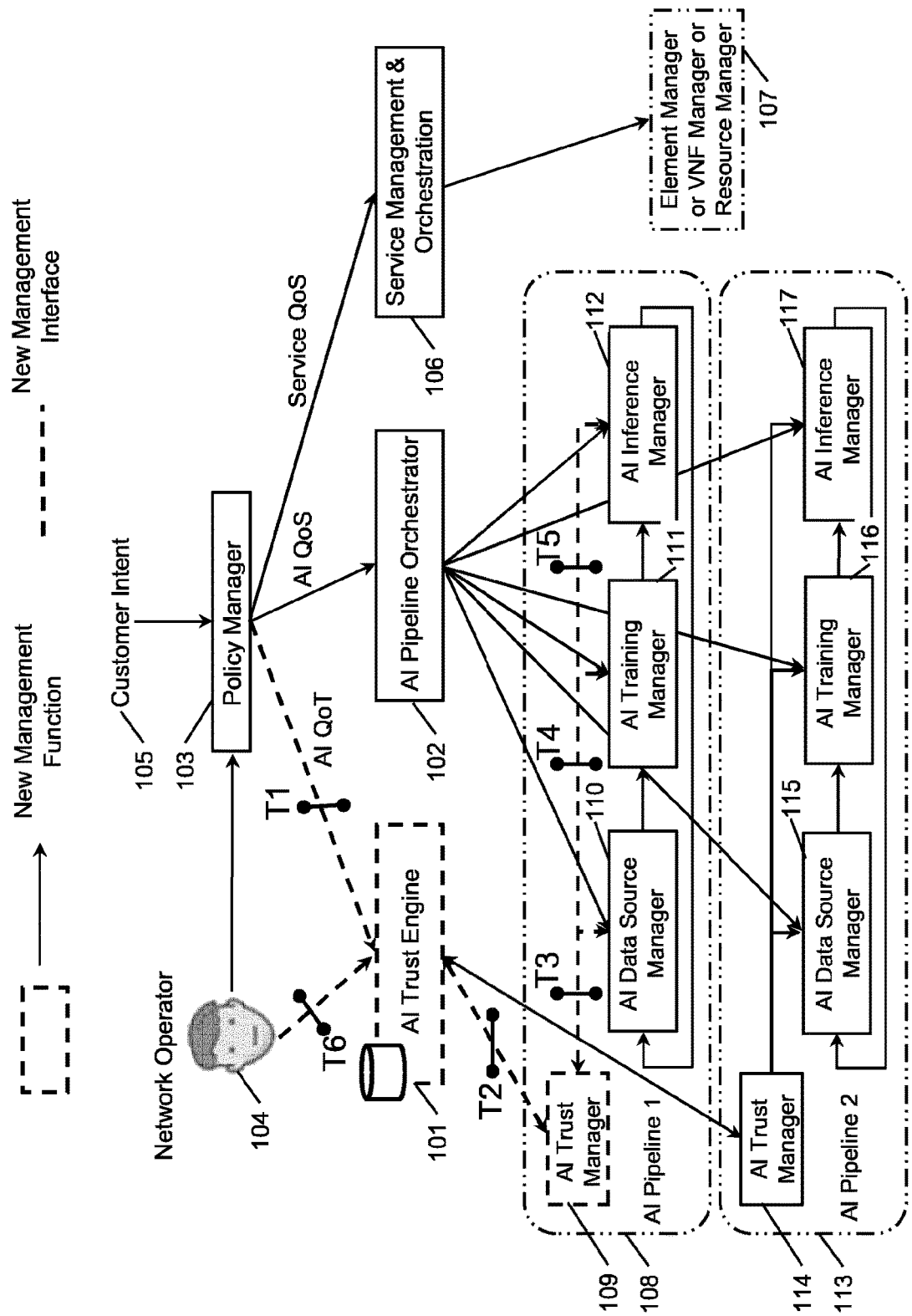
FIG. 1 shows an example of a TAIF in CANs according to the knowledge/development by the present inventors/applicant.

Referring now to FIG. 1, FIG. 1 shows an example of a TAIF in CANs as conceived by the present inventors/applicant, filed as a PCT patent application with application number PCT/EP2021/062396. Subsequent explanations refer to the terminology and basic functionality introduced thereby.

In particular, according to FIG. 1, the TAIF introduces two management functions, the AI Trust Engine (one per management domain) and the AI Trust Manager (one per AI/ML Pipeline) and six interfaces (T1 to T6) that support the interactions in the TAIF. Furthermore, there is also introduced the concept of AI Quality of Trustworthiness (AI QoT; see also Table 1) (as seen over T1 interface in FIG. 1) to define AI/ML model trustworthiness in a unified way covering three factors, i.e., fairness, explainability and robustness, similar to how QoS is used for network performance.

Figure 2:
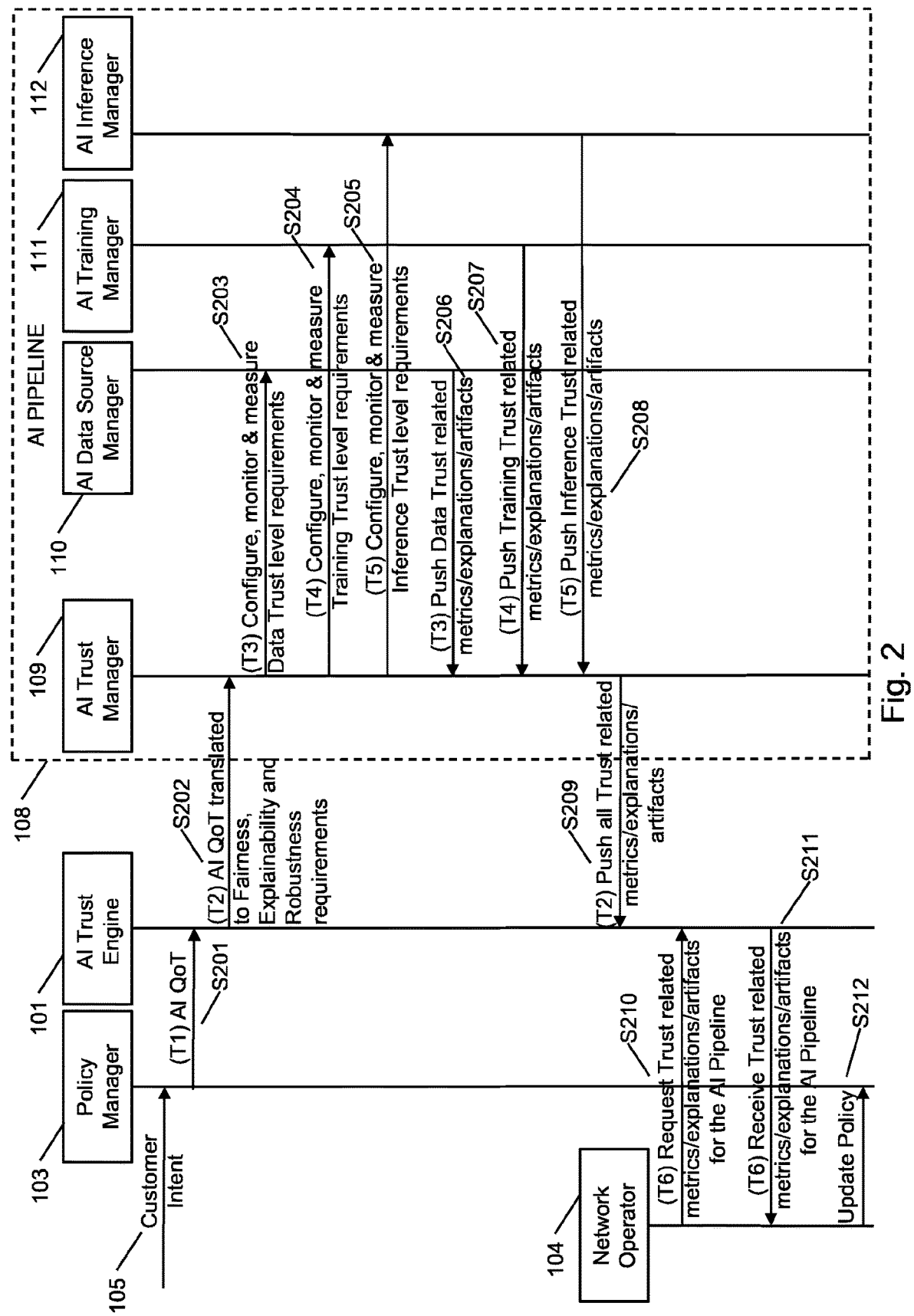
FIG. 2 shows a generic workflow in the TAIF according to various examples of embodiments.

The generic workflow in the TAIF is shown in FIG. 2. Once the Policy Manager 103 receives the Intent 105 from the customer, it is translated into AI QoT Intent/Class Identifier and sent, in S201, to the AI Trust Engine 101 over T1 interface. Examples for AI QoT Intents/Class Identifiers according to at least some examples of embodiments are outlined in Table 1.

TABLE 1

AI QoT Class Identifiers for TAI in CANs

| AI QoT | Example Services | Fairness (Quantitative - e.g., Theil Index) | Explainability (Qualitative - e.g., explainable model & Quantitative - e.g., Faithfulness) | Robustness (Quantitative - e.g., Loss Sensitivity) |
|---|---|---|---|---|
| Class 1 | Autonomous Driving | High | Very High | Very High |
| . | . | . | . | . |
| . | . | . | . | . |
| . | . | . | . | . |
| Class N | Movie Streaming | Low | Very Low | Low |

According to Table 1, for example, an AI QoT of "Class 1" is required for Autonomous Driving. Thus, the requirements "Fairness", "Explainability" and "Robustness" are "High", "Very High" and "Very High", respectively. In contrast thereto, "Low", "Very Low" and "Low", respectively, are to be satisfied for Movie Streaming (AI QoT of "Class N").

The AI Trust Engine 101 translates the AI QoT Intent/Class Identifier into AI Trustworthy (i.e., Fairness, Robustness and Explainability) requirements and sends it, in S202, to the AI Trust Manager 109 of the AI Pipeline 108 over T2 interface. It shall be noted that there may be a plurality of AI Pipelines, like e.g. AI Pipelines 108 and 113 (including respective instances 109 to 112 and 114 to 117) as indicated in FIG. 1. The AI Trust Manager 109 configures, monitors and measures AI Trustworthy requirements (i.e., trust mechanisms and trust metrics) for AI Data Source Manager 110, AI Training Manager 111 and AI Inference Manager 112 over T3, T4 and T5 interfaces respectively. In S203 to S208, the measured or collected Trustworthy metrics/artefacts/explanations from AI Data Source Manager 110, AI Training Manager 111 and AI Inference Manager 112 regarding the AI Pipeline 108 are pushed to the AI Trust Manager 109 over T3, T4 and T5 interfaces respectively. Then, in S209, the AI Trust Manager 109 over T2 interface pushes all Trustworthy metrics/artefacts/explanations of the AI Pipeline 108 to the AI Trust Engine 101 which stores the information in a Trust Knowledge Database. Finally, in S210, the Network Operator 104 can request and, in S211, receive the Trustworthy metrics/explanations/artefacts of an AI Pipeline 108 from the AI Trust Engine 101 over T6 interface. Based on the information retrieved, the Network Operator 104 may decide, in S212, to update the policy via Policy Manager 103.

As outlined above the TAI key definitions/metrics are fairness, explainability and robustness. In order to realize each of those aspects different techniques/methods/algorithms with different parametrisation may be applicable (i.e., different combinations of settings may be applicable, wherein the settings represent e.g. the different techniques/methods/algorithms with different parametrisation).

With respect to fairness there are the following approaches and algorithms applicable:
  Pre-processing fairness—To detect bias in the AI/ML training data using algorithms such as Reweighing, Optimized Pre-processing, Learning Fair Representations and Disparate impact remover;
  In-processing fairness—To detect bias during the AI/ML model generation using algorithms such as Prejudice Remover, Meta Fair Classifier and Adversarial debiasing; and
  Post-processing fairness—To detect bias in the AI/ML model decisions using algorithms such as Odds equalizing, Calibrated Equalized Odds and Reject Option Classification.

With respect to explainability the following approaches and algorithms are applicable:
  Pre-modelling explainability—To understand or describe data used to develop AI/ML models. For example, using algorithms such as ProtoDash and Disentangled Inferred Prior VAE;
  Explainable modelling/Interpretable modelling—To develop more explainable AI/ML models, e.g., ML models with joint prediction and explanation or surrogate explainable models. For example, using algorithms such as Generalized Linear Rule Models and Teaching Explainable Decisions (TED); and
  Post-modelling explainability—To extract explanations from pre-developed AI/ML models. For example, using algorithms such as ProtoDash, Contrastive Explanations Method, Profweight, LIME and SHAP.

Furthermore, explanations can be local (i.e., explaining a single instance/prediction) or global (i.e., explaining the global AI/ML model structure/predictions, e.g., based on combining many local explanations of each prediction).

With respect to robustness (adversarial) to attacks such as Evasion, Poisoning, Extraction, Inference, several techniques can be used against the attacks: Preprocessor, Postprocessor, Trainer, Transformer Detector.

Thus, as already indicated above, depending on the requirements of an use case (e.g., low-latency), (parts of) the AI/ML pipeline 108 may need to be deployed at network entities with scarce resource capabilities (e.g., edge nodes with limited memory, computation and networking). In such an environment, realizing the desired AI QoT for an AI/ML pipeline 108 (i.e., by employing various TAI methods) without violating the desired AI QoS may result in conflicts/issues while utilizing the scarce network resources to implement various AI/ML-related methods. If such conflicts/issues are not properly managed it may lead to a drop in AI model and network performance (QoS) as well as to network instabilities.

Therefore, there is a need to perform a feasibility check, for implementing a particular TAI method, to achieve the desired QoT by considering the actual network circumstances. Furthermore, the (network) operator 104 needs methods for resolving such resource usage issues/conflicts when realizing the TAI Framework and the desired level of AI QoT as indicated by the customer (e.g. user) 105a.

Taking even a step further, if the QoS of the AI Pipeline 108 is negotiable and can be sacrificed to a certain extent in order to fulfil desired QoT level, performing the trade-off between QoT, QoS and available resources becomes complex but extremely important task for achieving high network efficiency—providing the best possible service by minimizing the associated costs (e.g. the associated required (network) resource capabilities).

The AI Trust Manager 109 is the use case and vendor specific manager, which knows the AI trust capabilities of the AI Pipeline 108 and how to configure it and collect the metrics. The AI Trust Engine 101 operates on behalf of different vendor-specific AI Trust Managers 109, 114 and decides on the techniques/algorithms to be used in order to realize the desired level of trust, as indicated by the Customer 105a (by the customer intent/user intent 105) and translated into desired QoT by the Policy Manager 103. In order for the AI Trust Engine 101 to choose the right technique/algorithm for fulfilling the required QoT without creating the resource usage (and QoS) conflicts/issues in the operating network, the information on the available resources needs to be known. Therefore, the AI Trust Engine 101 needs the AI Pipeline Orchestrator 102 to provide an open and preferably standardized interface for acquiring the information on resources in the network needed for realizing certain QoT. However, no interface for this exists.

The present disclosure thus provides, according to various examples of embodiments as outlined below in detail, a flexible and/or efficient solution for feasibility checking of AI pipeline trustworthiness. In particular, there is provided, according to at least some examples of embodiments, a solution for performing a feasibility check, for implementing a particular TAI method, to achieve the desired QoT by considering the actual network circumstances. Furthermore, methods are provided to the network operator 104 for resolving such resource usage issues/conflicts when realizing the TAI Framework and the desired level of AI QoT as indicated by the customer/user 105a. In further detail, there is provided/established an interface between the AI Trust Engine 101 and the AI Pipeline Orchestrator 102 (which is not provided/established according to FIG. 1).

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks like 4G and/or LTE (and even 6G) where mobile communication principles are integrated, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network or data-center networking.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit (CU), which controls a respective coverage area or cell(s) and with which one or more communication stations such as communication elements or functions, like user devices (e.g. customer devices), mobile devices, or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, (core) network elements or network functions ((core) network control elements or network functions, (core) network management elements or network functions), such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a mobile device, a terminal device, control elements or functions, such as access network elements, like a base station (BS), an eNB/gNB, a radio network controller, a core network control element or function, such as a gateway element, or other network elements or functions, as described herein, (core) network management element or function and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

According to at least some examples of embodiments, the idea underlying the present disclosure is to define a method and an apparatus for exchange of information on QoT requirements and associated resource requirements/constraints as well as actual (network) resource capabilities, in order to perform the optimal trade-off and realize the desired QoT in the most efficient way. Such information is exchanged between the network functions/entities having the knowledge on desired QoT, e.g. AI Trust Engine 101, and the functions/entities having an overview of the available network resources, e.g. AI Pipeline Orchestrator 102. Alternatively, the information on the available network resources may be acquired from an inventory repository.

In order to enable such information exchange in the TAI Framework according to FIG. 1, there is defined a new interface (e.g. labelled/named "T7") between the AI Trust Engine 101 and AI Pipeline Orchestrator 102 along with the APIs for AI/ML feasibility check that allow the AI Trust Engine 101, over the new T7 interface, to discover the resource capabilities of the use case-specific CNF or AI pipeline 108 (or 113), to realize required QoT without jeopardizing the "regular" operation of the AI pipeline 108 (QoS) and the network performance.

The Trust Engine 101 derives different alternative ways of realizing required QoT in the form of different combinations of:
Techniques/methods/algorithms
Parameters of techniques/methods/algorithms
AI Pipeline phase on which the techniques/methods/algorithms shall be executed
Network entity characteristics on which the techniques/methods/algorithms shall be executed (e.g. hardware with available acceleration)

According to at least some examples of embodiments, the AI Trust Engine 101 associates priorities to derived alternative ways of realizing a required QoT and inquires the information from AI Pipeline Orchestrator 102 if any of alternative ways (in the priority order) is feasible with respect to actual resource constraints/capabilities. It shall be noted that a plurality of such alternative ways may be understood as a plurality of combinations of settings. Regarding the association and/or determination of priorities, it shall further be noted that this may be obtained/result from internal logic of the AI Trust Engine 101 and could be based on predefined policies/preferences, like (without limitation to the examples given in the following) e.g. which TAI techniques are preferred to be used and/or on which network function this is preferred to be executed. Moreover, regarding the derivation of alternatives, it shall further be noted that this may be obtained/result from internal logic of the AI Trust Engine 101, (without limitation to the examples given in the following) e.g. based on the input/knowledge, which techniques can achieve which QoT in which phase of the AI Pipeline 108. It shall furthermore be noted that, alternatively and/or optionally, an additional example for the association and/or determination of the priorities and/or the derivation of the alternatives could be to take into account, if this information is available, whether the QoT is negotiable or not (i.e. whether the QoT could be sacrificed and to what extent). Hence, according to various examples of embodiments and with reference to Table 1 for explanation purposes only, for example the (AI) QoT of "Class 1" required for Autonomous Driving may be determined to be at least "High" for each of the requirements on "Fairness", "Explainability" and "Robustness". Thus, in such example, the requirements on "Explainability" and "Robustness" may be "sacrificed" to become "High" instead of "Very High". Accordingly, the level "High" may serve as a trustworthiness threshold value, which defines a minimum level of trustworthiness that has to be satisfied (i.e. reached or exceeded). Such trustworthiness threshold value (as for example included in e.g. trustworthiness threshold value information, which the AI Trust Engine 101 may obtain from e.g. the Policy Manager 103 or another network entity) may be defined for each requirement individually, for several requirements at the same time, and/or for different scenarios/combinations of to be satisfied requirements. For example, one requirement may at least be "High", if the remaining requirements are at least "Very High", whereas the one requirement must be "Very High", if at least one of the remaining requirements is not "Very High".

The feasibility with respect to resource constraints/capabilities of the AI pipeline 108 to realize a required QoT is indicated by a Cost Derivation Functionality e.g. within the Pipeline Orchestrator 102 in the form of a cost of realizing specific technique/method/algorithm, its associated parametrization and additional constraints as indicated by the Trust Engine 101, for a given deployment of a AI Pipeline 108/use case. Here, it shall be noted that the Cost Derivation Functionality does not necessarily need to be included and/or associated to the Pipeline Orchestrator 102. However, if the Cost Derivation Functionality is included and/or associated to the Pipeline Orchestrator 102, it may be understood that the feasibility with respect to resource constraints/capabilities is indicated by the Pipeline Orchestrator 102. Furthermore, the expression "cost" does not necessarily need to be expressed in a currency, but may correspond to resource capabilities that are required at the CNF and/or the AI Pipeline in order to implement a certain way (from at least one derived alternative ways)/a certain combination of settings (from at least one combination of settings).

According to various examples of embodiments, the cost provided by the Cost Derivation Functionality realized e.g. within the AI Pipeline Orchestrator 102 is associated with the following additional information/metadata:
AI Pipeline phase to which the cost refers to:
Training cost
Inference cost
Data source (collection/processing) cost
Type of the cost:
Estimated cost—is calculated based on the current network state and is subject of changes. Notification of cost changes are communicated over T7 interface.
Guaranteed cost—is not subject of change within a given resolution, e.g. time window Time granularity of the cost:
  Time window for which the cost is estimated/guaranteed
  Start time after which the cost is estimated/guaranteed
Space granularity of the cost:
  Cost valid for certain domain (technology, network, administrative)
  Cost valid for specific network entity/function (VNF/PNF, cloud/gNB-DU, accessibility of hardware/acceleration)

In order to derive the cost, the Cost Derivation Functionality may take into account the information (e.g. negotiation information) if the QoS is negotiable, i.e. if it can be sacrificed and to what extent. This information might be provided e.g. by the Policy Manager 103 given the required Customer Intent 105 and Network operator 104 policies. Regarding such information (e.g. negotiation information) to be taken into account by the Cost Derivation Functionality, it may e.g. be indicated, whether by applying a certain alternative way for realizing the QoT, the QoS is allowed to be impacted or not. AI QoS and AI QoT are interrelated, i.e. realizing a certain QoT may impact an interrelated AI QoS and vice versa. By default, the Cost Derivation Functionality may e.g. derive the cost of realizing the certain QoT without violating the QoS, which might impose more restrictions on how to realize the QoT (e.g. if the same resource/network node can be used to realize a QoT technique in addition to running an inference algorithm, which might as a consequence impact its speed). If the QoS is negotiable, i.e. if it can be "violated" to a certain extent, there might be less restrictions on e.g. (re-)using the resources (for realizing QoT techniques).

Below, there is provided a listing of APIs (offered by e.g. the AI Pipeline Orchestrator 102 and consumed by e.g. the AI Trust Engine 101) for AI/ML model feasibility check introduced in this specification:

1. TAI Feasibility Discovery API (Request/Response): It allows the AI Trust Engine 101, via the T7 interface, to discover if a certain TAI technique/method/algorithm, associated parametrization and/or additional constraints are feasible for a given AI Pipeline 108 (or e.g. 113) deployment and under what cost.

2. TAI Feasibility Update Query API (Subscribe/Notify): It allows e.g. the AI Trust Engine 101, via the T7 interface, to query if there is an update in the cost for realizing a certain TAI technique/method/algorithm associated parametrization and/or additional constraints for a given AI Pipeline 108 (or e.g. 113) deployment.

It is to be noted that the TAI framework is used as an example for the present specification, but the proposal may also be applied to any other TAI frameworks.

Figure 3:
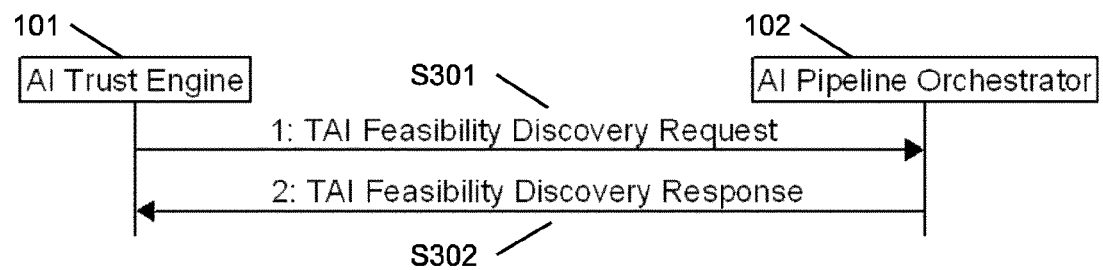
FIG. 3 shows a Trustworthy Artificial Intelligence, TAI, Feasibility Discovery API according to various examples of embodiments.

Now, reference is made to FIG. 3. FIG. 3 shows a TAI Feasibility Discovery API according to various examples of embodiments, which has two Information Elements (IEs) and the following parameters:

Information Element "TAI Feasibility Discovery Request" (TAIFReq) (e.g. feasibility discovery request) issued by e.g. the AI Trust Engine 101.

Information Element "TAI Feasibility Discovery Response" (TAIFResp) (e.g. feasibility discovery response) issued by e.g. the AI Pipeline Orchestrator 102.

An example implementation for the two IEs is shown in Tables 2 and 3.

TABLE 2

TAI Feasibility Discovery Request IE

| Parameter | Type | Description |
|---|---|---|
| CNF or AI Pipeline Scope | List | Which CNF or AI Pipeline instances the feasibility discovery is requested for |
| >CNF or AI Pipeline phase | List | For which CNF or AI Pipeline instances phase (training, inference, data collection/processing) the feasibility discovery is requested for |
| >>Technique/algorithm | List | For which technique/algorithm/method the feasibility shall be checked |
| >>Parameters | List | For which parameters of technique/algorithm/method the feasibility shall be checked |
| Network entity | List | Optionally, for which specific network entity the feasibility shall be checked |

TABLE 3

TAI Feasibility Discovery Response IE

| Parameter | | Type | Description |
|---|---|---|---|
| CNF or AI Pipeline Scope | | List | Which CNF or AI Pipeline instances the feasibility discovery is provided for |
| >Supported technique/algorithm | | List of Strings | Which AI TAI techniques/algorithms/methods are supported |
| >Cost | Phase info | List | Which cost is associated to realization of the technique/algorithm/method |
| | Type | | |
| | Time granularity | | |
| | Space granularity | | |
| Additional Information | | Free text | Free text description of feasibility information |

Figure 4:
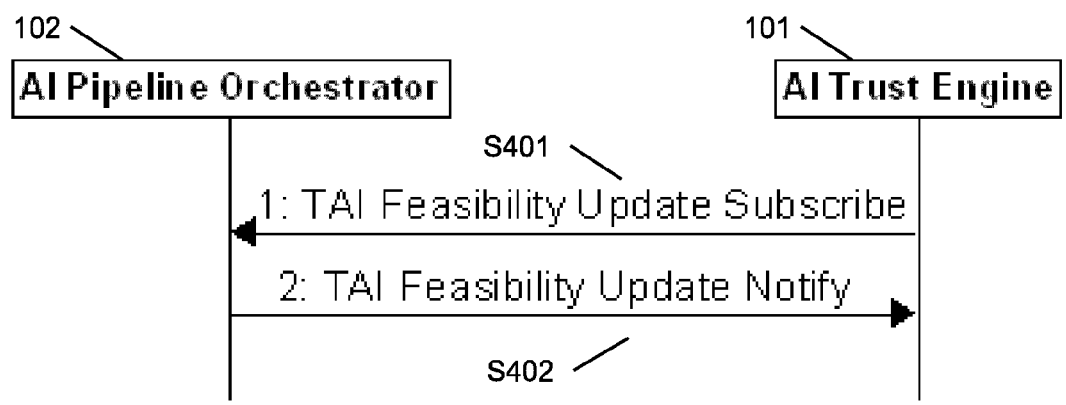
FIG. 4 shows a TAI Feasibility Update Query API according to various examples of embodiments.

Now, reference is made to FIG. 4. FIG. 4 shows a TAI Feasibility Update Query API according to various examples of embodiments, which has two IEs and the following parameters:

Information Element "TAI Feasibility Update Subscribe" (TAIFSub) (e.g. feasibility update subscription) issued by e.g. the AI Trust Engine 101.

Information Element "TAI Feasibility Update Notify" (TAIFNot) (e.g. feasibility update notification) issued by e.g. the AI Pipeline Orchestrator 102.

An example implementation for the two IEs is shown in Tables 4 and 5.

TABLE 4

TAI Feasibility Update Subscribe IE

| Parameter | Type | Description |
|---|---|---|
| CNF or AI Pipeline Scope | List | Which CNF or AI Pipeline instances the updates on feasibility for realizing certain QoT is requested |
| >CNF phase | List | For which CNF or AI Pipeline instances phase (training, inference, data collection/processing) the feasibility update is requested for |
| >>Technique/algorithm | List | For which technique/algorithm/method the feasibility update shall refer to |
| >>Parameters | List | For which parameters of technique/algorithm/method the feasibility update shall be checked. Including also the threshold settings for notifying about the updates. |

TABLE 4-continued

TAI Feasibility Update Subscribe IE

| Parameter | Type | Description |
|---|---|---|
| Network entity | List | Optionally, for which specific network entity the feasibility update shall be checked |

TABLE 5

TAI Feasibility Update Notify IE

| Parameter | | Type | Description |
|---|---|---|---|
| CNF or AI Pipeline Scope | | List | Which CNF or AI Pipeline instances the feasibility update is provided for |
| >Supported technique/ algorithm update | | List of Strings | Updated list of AI TAI technique/algorithm/methods that are supported |
| >Updated Cost | Phase info Type Time granularity Space granularity | List | Updates in the cost associated to realization of the technique/ algorithm/method |
| Additional Information | | Free text | Free text description of updated of feasibility information |

Figure 5A:
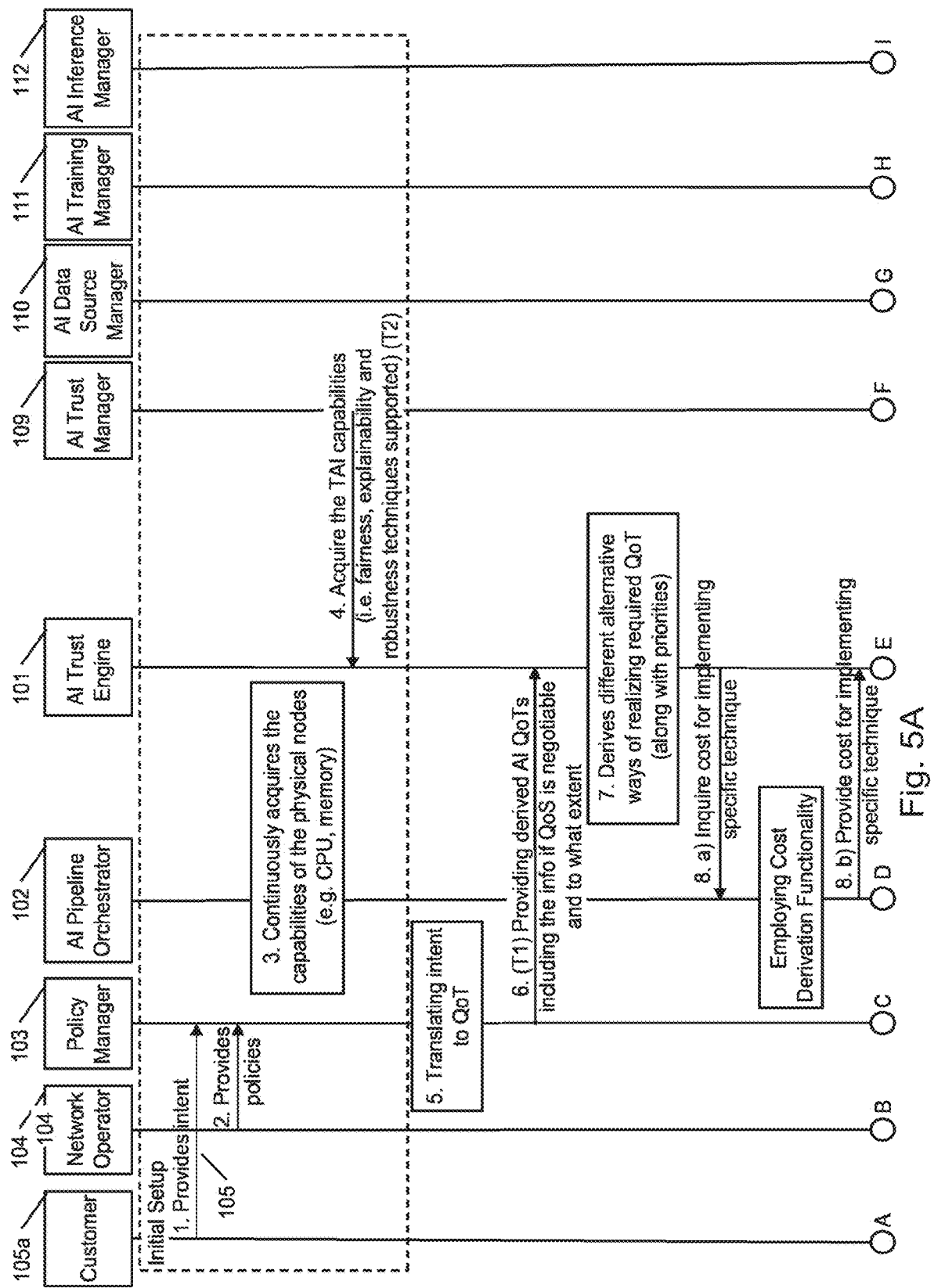
FIGS. 5A to 5C (wherein FIG. 5A and FIG. 5B are to be connected at capital letters A to I and A' to I'; wherein FIG. 5B and FIG. 5C are to be connected at capital letters A" to I" and A'" to I'") show TAI Feasibility Check Procedures according to various examples of embodiments.
Figure 5B:
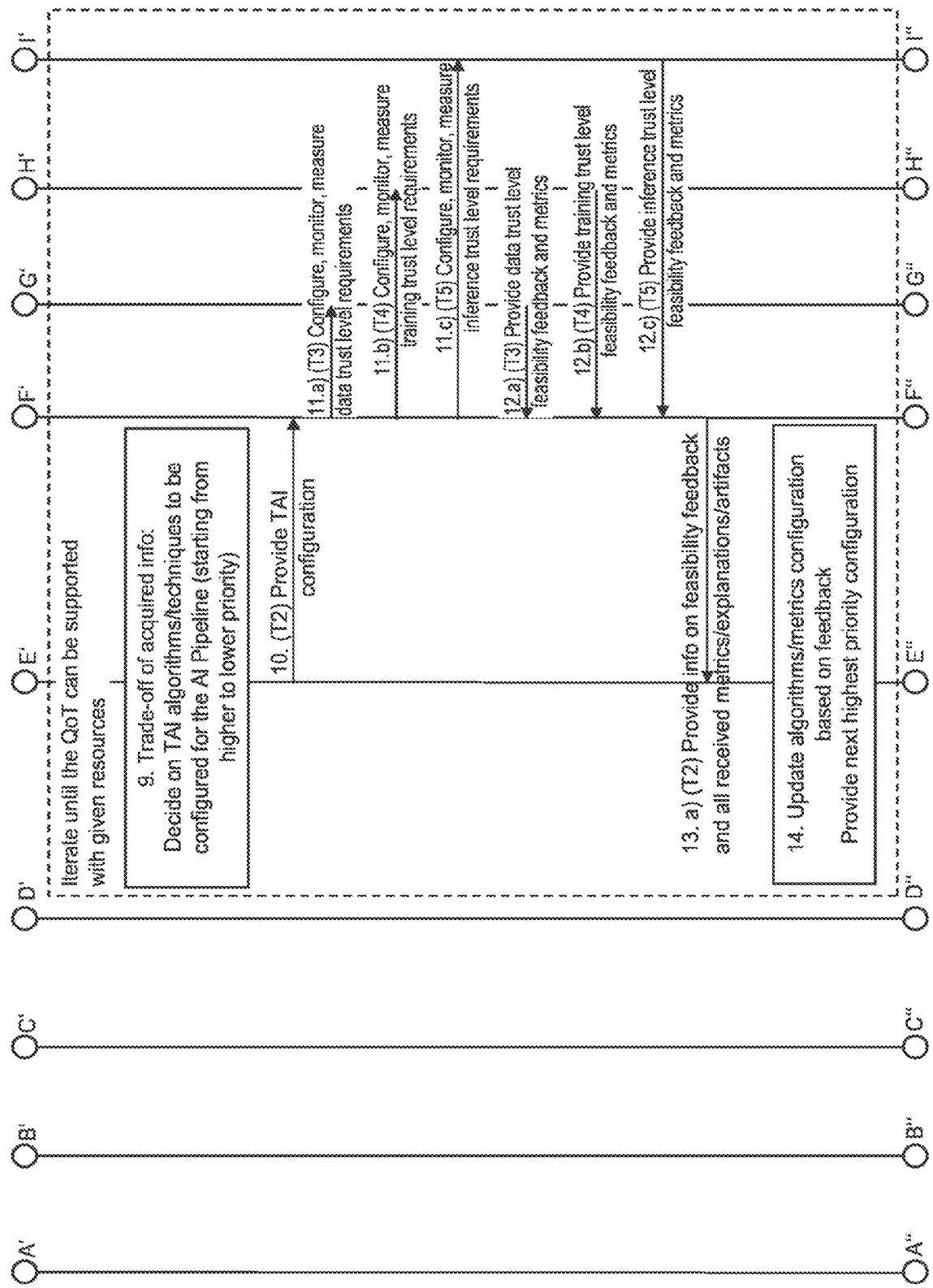
Figure 5C:
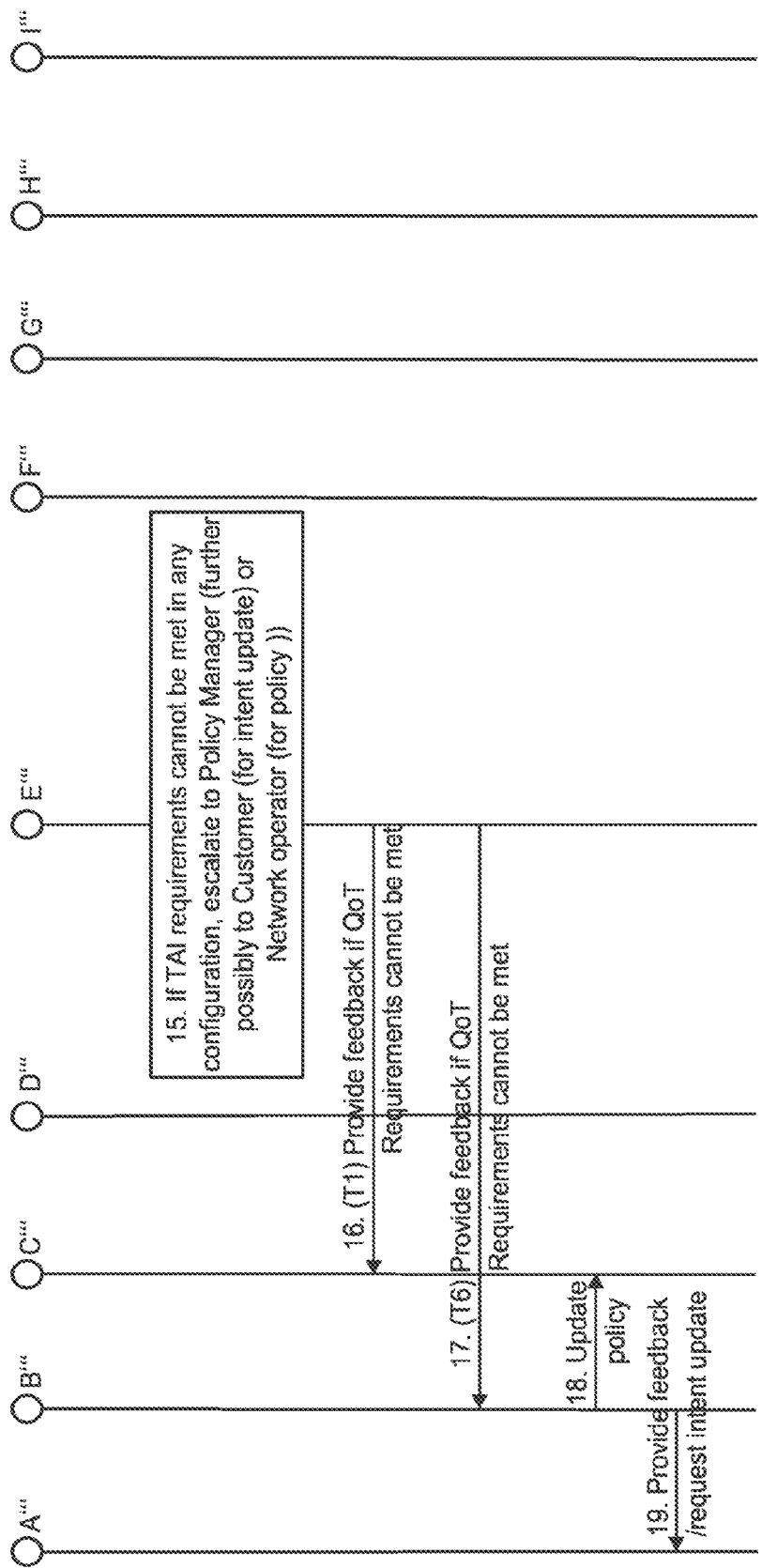

Referring now to FIGS. 5A to 5C, there are shown TAI Feasibility Check Procedures according to various examples of embodiments. In the following, for easier reference, the numbering used in FIGS. 5A to 5C is also used for describing the steps as outlined below.

Thus, steps 1 to 4 represent an Initial Setup. Accordingly, a customer/a user 105a requests for a service via Intent request 105. The Network Operator 104 provides the policies that need to be fulfilled to the Policy Manager 103. The AI Pipeline Orchestrator 102 continuously acquires the information regarding the status of the resources (of e.g. the (network) resource capabilities) in the network, e.g. in terms of CPU, memory, networking capabilities status. The AI Trust Engine 101 inquires the information on which algorithms/techniques/methods are supported by a specific AI Pipeline 108 (or e.g. 113). Optionally, and if available, the AI Trust Engine 101 may further inquire information coming from other entities specific to the AI Pipeline 108, e.g. a relation between QoS and QoT. Here, the relation between QoS and QoT may be understood to represent information on how much the realization of QoT on top would affect the QoS of the AI Pipeline 108. As mentioned above, there is an impact (interrelation) between QoS and QoT. In this specification, it may be assumed (without loss of a general validity) that such information can be available from some entity in the TAI Framework, and if available, such information can be taken into account (it would thus not be important, where actually such information is coming/acquired/obtained from).

Step 5. The Policy Manager 103 translates (by e.g. use of a table/look-up-table) the Customer Intent 105 to required service QoS, AI QoS and AI QoT.

Step 6. The Policy Manager 103 provides the derived QoT information to the AI Trust Engine 101 via T1 interface. In addition, the Policy Manager 103 or other entity may provide, to the AI Trust Engine 101, the information whether the AI QoS is negotiable and to what extent.

Step 7. The AI Trust Engine 101 derives (by e.g. use of a table/look-up-table) from the received QoT information the associated requirements, on Fairness, Explainability and Robustness. The AI Trust Engine 101 derives (as already outlined/described above) different alternative ways (different combinations of settings) for realizing the required QoT, e.g. in the form of different algorithms/methods/techniques and/or their parametrization which can satisfy the required QoT. That is, for example, the AI Trust Engine 101 comprises and/or obtains and/or acquires respective information about how an application/implementation (in a specific AI Pipeline 108) of one algorithm/method/technique out of a plurality of different predetermined algorithms/methods/techniques may allow, in relation to a certain service (e.g. Autonomous Driving as indicated in Table 1) to satisfy (reach or exceed) at least one of the above-outlined requirements on Fairness, Explainability and Robustness. Thus, for a specific AI Pipeline 108, the AI Trust Engine 101 may know an influence/effect of applying/implementing such one algorithm/method/technique on the requirements on Fairness, Explainability and Robustness. Also, the AI Trust Engine 101 may know about how to combine at least two of such algorithms/methods/techniques in order to satisfy (reach or exceed) at least one of the above-outlined requirements on Fairness, Explainability and Robustness. Further, the AI Trust Engine 101 may also know about the influence/effect of adapting/configuring a respective algorithms'/methods'/techniques' parametrization. The AI Trust Engine 101 assigns/determines (as already outlined/described above) the priorities to such options.

Step 8.a) The AI Trust Engine 101 inquires the cost for realizing e.g. a specific combination of technique and its parameters for realizing required QoT in the current infrastructure (in the priority order of possible options provided in Step 6). See e.g. the TAI Feasibility Discovery Request IE as indicated in Table 2.

Step 8.b) The AI Pipeline Orchestrator 102 provides the cost for realizing the inquired technique and parameters. See e.g. the TAI Feasibility Discovery Response IE as indicated in Table 3. The Cost Derivation Functionality is employed in order to calculate the provided cost.

Step 9. The AI Trust Engine 101 performs a trade-off given the required level of QoT and the cost to realize it in a network and selects the best option. Each option (e.g. each different alternative way/each different combination of settings) has an associated priority as well as the (respectively) inquired cost for realizing it. The cost (associated with a certain option), however, may also be unacceptable for the AI Trust Engine 101. Thus, the performed trade-off is rather to choose the option (e.g. one option out of a plurality of options, wherein each option has an associated priority as well as an associated inquired cost) with the highest priority (among all priorities of the plurality of options) and an acceptable cost at the same time. Hence, the selection of the "best option" may be understood to select the option with the acceptable cost and the highest priority (among all priorities) at the same time. For example and without limiting a general validity, if priorities 1, 2 and 3, wherein '1' represents the lowest priority and '3' represents the highest priority, have costs 1, 10 and 100 respectively, the AI Trust Engine 101 may select the priority 2 as the best one, since cost 100 (of priority 3) may be unacceptable. Thus, there may be a predetermined and/or adjustable cost acceptability threshold value (e.g. a resource capability acceptability threshold value) stored/implemented/set at the AI Trust Engine

101, which prevents an option of unacceptable high cost to be further processed/configured for implementation. Regarding the above-outlined example, a cost acceptability threshold value above 10 leads to priority 2 being selected as the best option. Accordingly, a cost acceptability threshold value above 100 would lead to priority 3 being selected as the best option. One cost acceptability threshold value may relate to one or more AI Pipelines and/or several cost acceptability threshold values may relate to one AI Pipeline (wherein each cost acceptability threshold value may be valid for a different scenario present for one AI Pipeline, like e.g. a specific status of available resources).

In addition, the AI Trust Engine 101 may take into account (as already outlined/described above) the information, e.g. negotiation information, (if available) given by the Policy Manager 103, or other entity, if the AI QoS is negotiable and to what extent and the information on inherent impact between QoS and QoT may be given during the initial setup.

Step 10. The AI Trust Engine 101 provides the TAI configuration for selected option towards the AI Trust Manager 109.

Step 11. The AI Trust Manager 109 configures, monitors and measures AI Trustworthy requirements (i.e., trust mechanisms and trust metrics) for AI Data Source Manager 110, AI Training Manager 111 and AI Inference Manager 112, respectively.

Step 12. The AI Trust Manager 109 receives the information on feasibility of indicated configuration as well as related metrics (if configuration is feasible).

Step 13. The AI Trust Manager 109 provides the received information from Step 12 to the AI Trust Engine 101.

Step 14. In the case that the selected option is not feasible (e.g. due to sudden change in resource availability) the AI Trust Engine 101 updates its configuration (e.g. chooses to configure the option with lower priority).

Step 15. In the case that none of the TAI configuration options are feasible (e.g. due to sudden change in resource availability) the AI Trust Engine 101 may inform the Policy Manager 103 (in Step 16) for potential updates in policies (in Step 18), and/or to Network Operator 104 (in Step 17).

Step 19. If no remedy has been found (fitting requirements to available resources) the Network Operator 104 may inform the Customer 105*a*, for potential updates in intent.

According to at least some examples of embodiments, relying on the procedures described above and indicated in FIGS. 5A to 5C, there is provided an example implementation of proposed solution for a specific use case of mobility management/handover optimization. In the following, there is indicated only the use case as well as technology specifics related to this example, whereas generic procedures described above (in the description of Steps 1 to 19) hold.

Step 1-3 Hold as described above.

Step 4. The AI Trust Engine 101 inquires the information on which algorithms/techniques/methods are supported by a specific AI Pipeline 108. E.g. the AI Pipeline 108 for mobility optimization supports:

For Fairness: Pre-processing fairness: Reweighing, Optimized Pre-processing, Learning Fair Representations and Disparate impact remover, in-processing fairness: Prejudice Remover, Meta Fair Classifier and Adversarial debiasing, and post-processing fairness: Odds equalizing, Calibrated Equalized Odds For Explainability: Pre-modelling explainability: ProtoDash and Disentangled Inferred Prior VAE. Explainable modelling/Interpretable modelling: Generalized Linear Rule Models and Teaching Explainable Decisions (TED) and post-modelling explainability using algorithms such as ProtoDash, Contrastive Explanations Method, Profweight, LIME and SHAP. Both approaches are supported: Local and global.

For robustness: Preprocessor, Postprocessor, Trainer, Transformer Detector.

Step 5-6 Hold as described above.

Step 7. The AI Trust Engine 101 derives from the received QoT information the associated requirements, e.g. on Fairness=medium, Explainability=high and Robustness=high (on e.g. a scale comprising the elements "Very Low", "Low", "Medium", "High" and "Very High") for mobility management AI/ML Pipeline. The AI Trust Engine 101 derives different alternative ways for realizing required QoT, e.g. in the form of different algorithms/methods/techniques and their parametrization which can satisfy the required QoT. The AI Trust Engine 101 assigns the priorities to such options. E.g.

Prio 1: Fairness: In-processing fairness: Meta Fair Classifier and Adversarial debiasing, Explainability: local—explaining a single instance/prediction using Teaching Explainable Decisions (TED), Robustness: Preprocessor and Postprocessor Prio 2: Fairness: Adversarial debiasing, Explainability: global combining many local explanations of each prediction using TED, Robustness: Preprocessor Step 8.a) The AI Trust Engine 101 inquires the cost for realizing a specific combination of e.g. technique and its parameters for realizing required QoT in the current infrastructure for specific mobility AI Pipeline 108 (in the priority order of possible options provided in Step 6, e.g. The Prio 1 option from Step 7 above is checked first with respect to the cost.) See also the TAI Feasibility Discovery Request IE as indicated in Table 2. The AI Trust Engine 101 may also subscribe to any future updates in the resource costs that may occur in the network by using Feasibility Update Subscription (see Table 4).

Step 8.b) The AI Pipeline Orchestrator 102 provides the cost for realizing the inquired techniques and parameters. See TAI Feasibility Discovery Response IE as indicated in Table 3. If the AI Trust Engine 101 subscribed to future cost updates in Step 8 a) the AI Pipeline Orchestrator 102 provides such updates once applicable (see Table 5).

Step 9.-19. Hold as described above.

In the following, further exemplary embodiments are described in relation to the above described methods and/or apparatuses.

Referring now to FIG. 6, there is shown a flowchart illustrating steps corresponding to a method executable by a first network entity or function according to various examples of embodiments. Such first network entity or function may represent such AI Trust Engine 101 as outlined above with reference to FIGS. 1 to 5C. Further, the first network entity or function is associated to a network, wherein the network may represent such network as illustrated according to FIG. 1.

The first network entity or function has an interface configured to receive information in relation to an artificial intelligence, AI, trustworthiness level from a network management entity or function and a second network entity or function has an interface configured to receive information in relation to an AI service level from the network management entity or function. It shall be noted that an AI trustworthiness level and the AI service level may represent an AI QoT as well as an AI QoS respectively as outlined above with reference to FIGS. 1 to 5C. Further, the network management entity or function and the second network entity or function may represent such Policy Manager 103 as well as such AI Pipeline Orchestrator 102 as outlined above with reference to FIGS. 1 to 5C.

In particular, according to FIG. 6, in S610, the method comprises communicating with the second network entity or function via an interface established between the first network entity or function and the second network entity or function. Such established interface may represent such "T7" interface as introduced above.

Moreover, according to at least some examples of embodiments, the method may further comprise issuing (for communicating/as communication) a feasibility discovery request to the second network entity or function to discover resource capabilities of a part of the network on which the cognitive network function, CNF, or the AI Pipeline 108 is implemented/realized (wherein the first and second network entities or functions and the network management entity or function are associated to the network) in order to implement/realize the required AI trustworthiness level of the CNF or the AI pipeline 108.

It shall be noted that the feasibility discovery request may represent the above-outlined TAI Feasibility Discovery Request IE, wherein the instances may comprise the above-outlined AI Data Source Manager 110, AI Training Manager 111 and AI Inference Manager 112.

Furthermore, according to various examples of embodiments, the feasibility discovery request may comprise at least one of the following elements: a scope element, indicating for which CNF or AI pipeline instances a feasibility discovery is requested for; a phase element, indicating for which CNF or AI pipeline instances phase a feasibility discovery is requested for; a technique/algorithm element, indicating for which technique and/or algorithm and/or method a feasibility is to be checked; a parameters element, indicating for which parameters of a technique and/or an algorithm and/or method a feasibility is to be checked; and a network entity element, indicating for which network entity or function in the network a feasibility is to be checked.

Additionally, according to various examples of embodiments, the method may further comprise issuing (for communicating/as communication) a feasibility update subscription to the second network entity or function to be notified about an update in resource capabilities of a part of the network on which the cognitive network function, CNF, or the AI Pipeline 108 is implemented/realized (wherein the first and second network entities or functions and the network management entity or function are associated to the network) in order to implement/realize the required AI trustworthiness level of the CNF or the AI pipeline 108.

It shall be noted that the feasibility update subscription may represent the above-outlined TAI Feasibility Update Subscribe IE.

Optionally, according to at least some examples of embodiments, the feasibility update subscription comprises at least one of the following elements: a scope element, indicating for which CNF or AI pipeline instances a feasibility update for realizing the AI trustworthiness level is requested; a phase element, indicating for which CNF or AI pipeline instances phase a feasibility update for realizing the AI trustworthiness level is requested; a technique/algorithm element, indicating to which technique and/or algorithm and/or method a feasibility update is to refer; a parameters element, indicating for which parameters of a technique and/or an algorithm and/or a method a feasibility update is to be checked, the parameters element including threshold settings for notifying about an update; and a network entity element, indicating for which network entity or function in the network a feasibility update is to be checked.

Moreover, according to various examples of embodiments, the method may further comprise deriving, as a basis for the communicating, at least one combination of settings to be implemented at the part of the network on which the cognitive network function, CNF, or the AI Pipeline 108 is implemented/realized in order to realize the AI trustworthiness level of the CNF or AI pipeline 108 based on the satisfying trustworthiness level requirements associated with the AI trustworthiness level. The method further comprises assigning priorities to the at least one combination of settings, wherein the communicating further comprises issuing the feasibility discovery request and/or the feasibility update subscription for the at least one combination of settings based on the assigned priorities. Optionally, the assigning of the priorities may further be based on obtaining trustworthiness threshold value information, indicating whether the AI trustworthiness level is negotiable and to what extent, and assigning the priorities by taking the trustworthiness threshold value information into account.

It shall be noted that the at least one combination of settings may represent the above-described different alternative ways/different options.

Furthermore, according to at least some examples of embodiments, the method may further comprise obtaining (for communicating/as communication) resource capability information, indicating, for a combination of settings out of at least one combination of settings, resource capabilities and/or updated resource capabilities required at the part of the network on which the cognitive network function, CNF, or the AI Pipeline 108 is implemented/realized for implementation of the combination of settings in order to realize the AI trustworthiness level of the CNF or AI pipeline 108. Further, the method comprises that the communicating leads to selecting from the at least one combination of settings, wherein the at least one combination of settings are assigned different priorities by the first network entity or function, the combination of settings with highest priority; generating configuration information indicative of configuration information for implementation, of the selected combination of settings and associated resource capabilities and/or updated resource capabilities, at the part of the network on which the cognitive network function, CNF, or the AI Pipeline 108 is implemented/realized; providing the configuration information towards the CNF or the AI pipeline 108; and obtaining feasibility information from the CNF or AI pipeline 108, indicating whether the selected one combination of settings is feasible with respect to the configuration information.

It shall be noted that the required resource capabilities may represent the above-described cost for implementation of a specific combination of settings (a specific alternative way/option). Further, obtaining from the CNF or AI pipeline 108 may include obtaining from the AI Trust Manager 109 comprised by the CNF or AI pipeline 108.

Moreover, according to at least some examples of embodiments, the selecting may further comprise performing a trade-off, wherein the performing of the trade-off comprises evaluating whether a combination of settings and its associated required resource capabilities is acceptable or not, by comparing the associated required network capabilities to a predetermined network capability acceptability threshold value; and selecting the combination of settings with highest priority from among combinations of settings evaluated as being acceptable.

Further, according to at least some examples of embodiments, the evaluating may further comprise evaluating whether a combination of settings and its associated required resource capabilities is acceptable or not, by further taking into account whether the AI service level associated with a service requested by a user 105a is negotiable in relation to the AI trustworthiness level and to what extent.

Additionally, according to at least some examples of embodiments, if the feasibility information indicate that the selected one combination of settings is not feasible, the method may further comprise that the communicating leads to repeating the selecting, the generating and the providing in descending order of priority for another combination of settings out of the at least one combination of settings until the feasibility information indicate that the selected another combination of settings is feasible. If no combination of settings out of the at least one combination of settings is feasible, the method may further comprise that the communicating leads to reporting to the network management entity or function that the AI trustworthiness level is not met, and/or reporting to a network operator 104 operating the network that the AI trustworthiness level is not met, and/or causing a user 105a requesting a service associated to the AI service level to be informed about updates in the user's requested service.

Further, according to various examples of embodiments, the AI trustworthiness level is associated with trustworthiness level requirements; and the trustworthiness level requirements to be satisfied in order to realize the AI trustworthiness level are requirements on fairness, explainability and robustness.

The above-outlined solution for feasibility checking of artificial intelligence, AI, pipeline trustworthiness provides the following advantages (in addition to the advantages already outlined above).

Namely, a required AI trustworthiness level is realized without jeopardizing a "regular" operation of the AI Pipeline 108, that is e.g. without negatively impacting an AI service level, a service level and/or a QoS, and without jeopardizing the network performance. Moreover, the above-outlined solution defines an efficient and/or error-resistant solution (due to e.g. the "direct" communication via the interface established between the first and second network entities or functions).

Referring now to FIG. 7, there is shown a flowchart illustrating steps corresponding to a method executable by a second network entity or function according to various examples of embodiments. Such second network entity or function may represent such AI Pipeline Orchestrator 102 as outlined above with reference to FIGS. 1 to 5C. Further, the second network entity or function is associated to a network, wherein the network may represent such network as illustrated according to FIG. 1.

The second network entity or function has an interface configured to receive information in relation to an artificial intelligence, AI, service level from a network management entity or function, and a first network entity or function has an interface configured to receive information in relation to an AI trustworthiness level from the network management entity or function.

In particular, according to FIG. 7, in S710, the method comprises communicating with the first network entity or function via an interface established between the second network entity or function and the first network entity or function. It shall be noted that an AI trustworthiness level and the AI service level may represent an AI QoT as well as an AI QoS respectively as outlined above with reference to FIGS. 1 to 5C. Further, the network management entity or function and the first network entity or function may represent such Policy Manager 103 as well as such AI Trust Engine 101 as outlined above with reference to FIGS. 1 to 5C.

Furthermore, according to various examples of embodiments, the method may further comprise responding (for communicating/as communication) to a feasibility discovery request issued from the first network entity or function by issuing a feasibility discovery response to the first network entity or function. The feasibility discovery response is indicative of resource capabilities of a part of the network on which the cognitive network function, CNF, or the AI Pipeline 108 is implemented/realized (wherein the first and second network entities or functions and the network management entity or function are associated to the network) in order to implement/realize the AI trustworthiness level of the CNF or the AI pipeline 108.

It shall be noted that the feasibility discovery response may represent the above-described TAI Feasibility Discovery Response IE.

Additionally, according to various examples of embodiments, the feasibility discovery response may comprise at least one of the following elements: a scope element, indicating which CNF or AI pipeline instances a feasibility discovery is provided for; a supported technique/algorithm element, indicating which AI Trustworthy Artificial Intelligence, TAI, technique and/or algorithm and/or method is supported by the CNF or AI pipeline 108; a cost element, wherein the cost element is related to a usage of resource capabilities of the part of the network on which the CNF or the AI Pipeline 108 is implemented/realized in order to implement/realize the AI trustworthiness level of the CNF or the AI pipeline 108, the cost element comprising at least one of cost for phase info, type, time granularity and space granularity, indicating which cost is associated with to realization of a technique and/or an algorithm and/or a method; and an additional information element, indicating a free text description of feasibility information.

Further, according to various examples of embodiments, the method may further comprise, based on a feasibility update subscription issued from the first network entity or function, issuing (for communicating/as communication) a feasibility update notification to the first network entity or function. The feasibility update notification is indicative of an update in resource capabilities of a part of the network on which the cognitive network function, CNF, or the AI Pipeline 108 is implemented/realized (wherein the first and second network entities or functions and the network management entity or function are associated to the network) in order to implement/realize the AI trustworthiness level of the CNF or the AI pipeline 108.

It shall be noted that the feasibility update notification may represent the above-described TAI Feasibility Update Notify IE.

Additionally, according to at least some examples of embodiments, the feasibility update notification may comprise at least one of the following elements: a scope element, indicating for which CNF or AI pipeline instances a feasibility update is provided for; a supported technique/algorithm update element, indicating an updated list of AI Trustworthy Artificial Intelligence, TAI, techniques and/or algorithms and/or methods that are supported by the CNF or AI pipeline 108, an updated cost element, wherein the cost element is related to a usage of resource capabilities of the part of the network on which the CNF or the AI Pipeline 108 is implemented/realized in order to implement/realize the AI trustworthiness level of the CNF or AI pipeline 108, the updated cost element comprising at least one of updated cost for phase info, type, time granularity and space granularity, indicating updates in a cost associated to a realization of a technique and/or an algorithm and/or a method; and an additional information element, indicating free text description of updated feasibility information.

Optionally, according to at least some examples of embodiments, the phase info indicate that the required resource capabilities refer to at least one of training resource capabilities, inference resource capabilities and data source resource capabilities; the type indicates that the required resource capabilities refer to estimated resource capabilities or guaranteed resource capabilities, wherein the estimated resource capabilities are calculated based on resource capabilities available at the part of the network on which the CNF or the AI Pipeline 108 is implemented/realized in order to implement/realize the AI trustworthiness level of the CNF or AI pipeline 108 and are subject of changes, and wherein the guaranteed resource capabilities are not subject of change within a predetermined time window; the time granularity indicates at least one of a time window for which the required resource capabilities are estimated or guaranteed, and a start time after which the required resource capabilities are estimated or guaranteed; and the space granularity indicates at least one of the required resource capabilities for a specific technology and/or radio network and/or administrative, and the required resource capabilities for a specific network entity or function.

Furthermore, according to various examples of embodiments, the method may further comprise, continuously acquiring, as a basis for the communicating, network resource capability information regarding the resource capabilities of the part of the network on which the CNF or the AI Pipeline 108 is implemented/realized for realizing the AI trustworthiness level of the CNF or the AI pipeline 108. The feasibility discovery response and/or the feasibility update notification is based on the method comprising calculating resource capabilities required for implementation of a combination of settings at the part of the network on which the CNF or the AI Pipeline 108 is implemented/realized in order to realize the AI trustworthiness level of the CNF or the AI pipeline 108, based on the continuously acquired network resource capability information, wherein the combination of settings is indicated by the feasibility discovery request and/or the feasibility update subscription.

Additionally, according to various examples of embodiments, the method may further comprise obtaining (for communicating/as communication) negotiation information indicating whether the AI service level associated with a service requested by a user 105a is negotiable in relation to the AI trustworthiness level and to what extent, wherein the method further comprises that the calculating comprises calculating the required resource capabilities based on taking the negotiation information into account.

The above-outlined solution for feasibility checking of artificial intelligence, AI, pipeline trustworthiness provides the following advantages (in addition to the advantages already outlined above).

Namely, a required AI trustworthiness level is realized without jeopardizing a "regular" operation of the AI Pipeline 108, that is e.g. without negatively impacting an AI service level, a service level and/or a QoS, and without jeopardizing the network performance. Moreover, the above-outlined solution defines an efficient and/or error-resistant solution (due to e.g. the "direct" communication via the interface established between the first and second network entities or functions).

Figure 8:
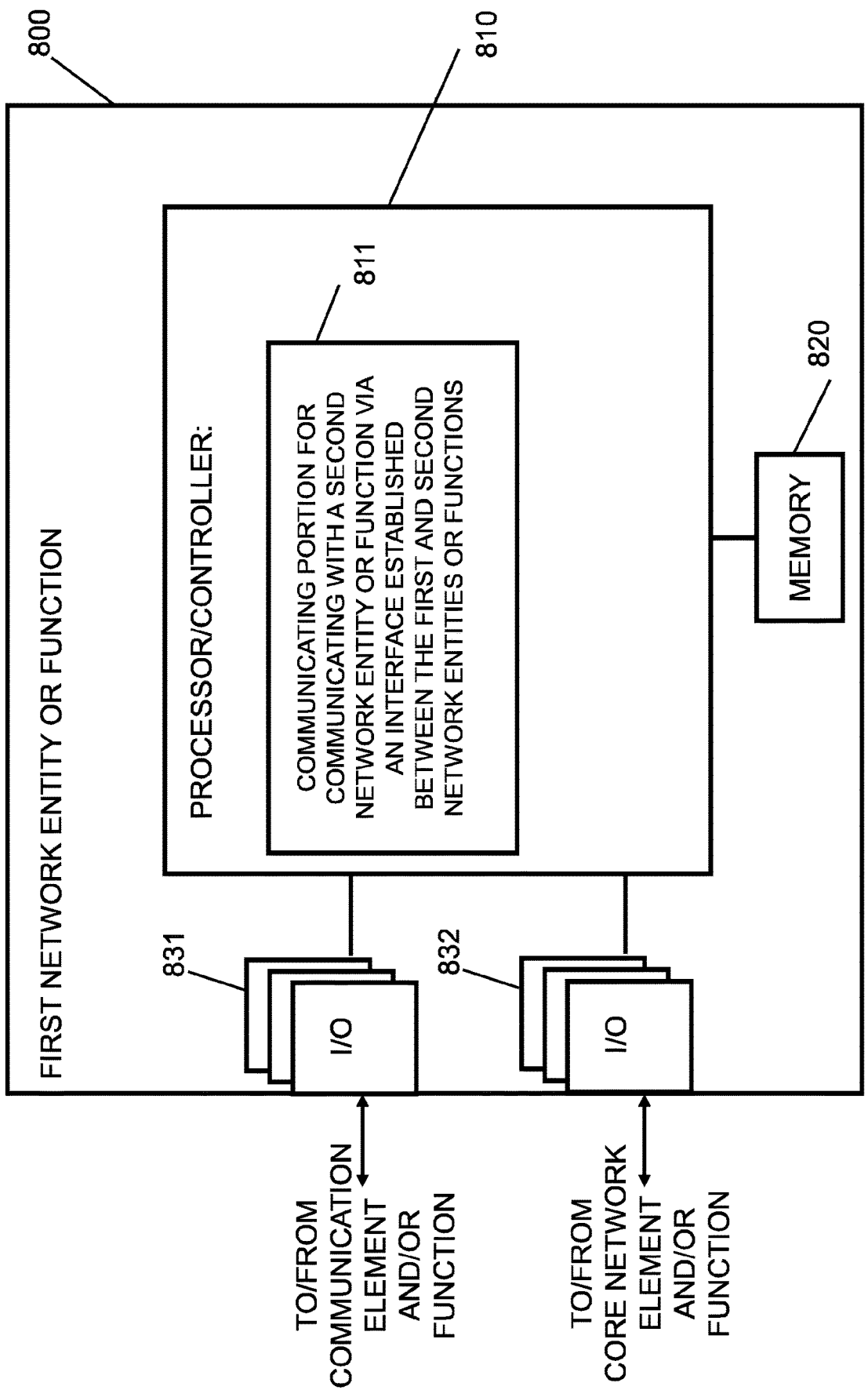
FIG. 8 shows a block diagram illustrating a first apparatus according to various examples of embodiments.

Referring now to FIG. 8, FIG. 8 shows a block diagram illustrating a first apparatus 800 according to various examples of embodiments.

Specifically, FIG. 8 shows a block diagram illustrating a first apparatus 800, which may represent a first network entity or function, like e.g. such AI Trust Engine 101 as outlined above with reference to FIGS. 1 to 5C, according to various examples of embodiments, which may participate in a process of feasibility checking of AI pipeline trustworthiness. Furthermore, even though reference is made to a (first) network entity or function, the network entity or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 800 shown in FIG. 8 may include a processing circuitry, a processing function, a control unit or a processor 810, such as a CPU or the like, which is suitable to enable feasibility checking of AI pipeline trustworthiness. The processor 810 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 831 and 832 denote input/output (I/O) units or functions (interfaces) connected to the processor or processing function 810. The I/O units 831 and 832 may be a combined unit including communication equipment towards several entities/elements, or may include a distributed structure with a plurality of different interfaces for different entities/elements. Reference sign 820 denotes a memory usable, for example, for storing data and programs to be executed by the processor or processing function 810 and/or as a working storage of the processor or processing function 810. It is to be noted that the memory 820 may be implemented by using one or more memory portions of the same or different type of memory, but may also represent an external memory, e.g. an external database provided on a cloud server.

The processor or processing function 810 is configured to execute processing related to the above described processing. In particular, the processor or processing circuitry or function 810 includes one or more of the following sub-portions. Sub-portion 811 is a processing portion, which is usable as a portion for communicating with a second network entity or function via an interface established between the first and second network entities or functions. The portion 811 may be configured to perform processing according to S610 of FIG. 6.

Figure 9:
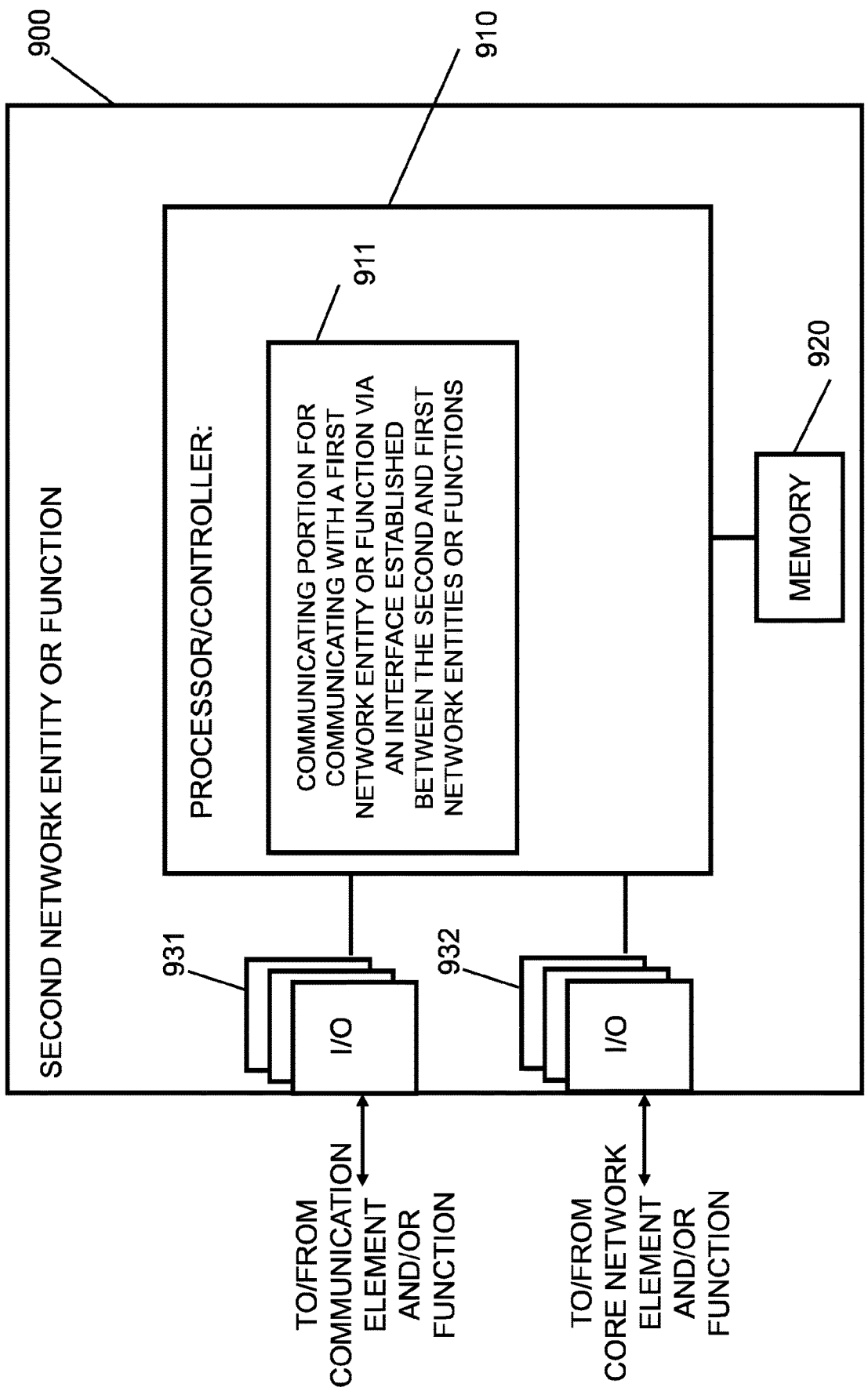
FIG. 9 shows a block diagram illustrating a second apparatus according to various examples of embodiments.

Referring now to FIG. 9, FIG. 9 shows a block diagram illustrating a second apparatus 900 according to various examples of embodiments.

Specifically, FIG. 9 shows a block diagram illustrating a second apparatus 900, which may represent a second network entity or function, like e.g. such AI Pipeline Orchestrator 102 as outlined above with reference to FIGS. 1 to 5C, according to various examples of embodiments, which may participate in a process of feasibility checking of AI pipeline trustworthiness. Furthermore, even though reference is made to a (second) network entity or function, the network entity or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 900 shown in FIG. 9 may include a processing circuitry, a processing function, a control unit or a processor 910, such as a CPU or the like, which is suitable to enable feasibility checking of AI pipeline trustworthiness. The processor 910 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 931 and 932 denote input/output (I/O) units or functions (interfaces) connected to the processor or processing function 910. The I/O units 931 and 932 may be a combined unit including communication equipment towards several entities/elements, or may include a distributed structure with a plurality of different interfaces for different entities/elements. Reference sign 920 denotes a memory usable, for example, for storing data and programs to be executed by the processor or processing function 910 and/or as a working storage of the processor or processing function 910. It is to be noted that the memory 920 may be implemented by using one or more memory portions of the same or different type of memory, but may also represent an external memory, e.g. an external database provided on a cloud server.

The processor or processing function 910 is configured to execute processing related to the above described processing. In particular, the processor or processing circuitry or function 910 includes one or more of the following sub-portions. Sub-portion 911 is a processing portion, which is usable as a portion for communicating with a first network entity or function via an interface established between the first and second network entities or functions. The portion 911 may be configured to perform processing according to S710 of FIG. 7.

The first apparatus 800 and the second apparatus 900 as outlined above with reference to FIGS. 8 and 9 may comprise further/additional sub-portions, which may allow the first apparatus 800 and the second apparatus 900 to perform such methods/method steps as outlined above. In particular, further/additional sub-portions may allow the first apparatus 800 and the second apparatus 900 to perform e.g. such processing/method steps as described above with reference to FIGS. 1 to 5C, in particular as outlined in detail with regard to FIGS. 5A to 5C.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. A method, executable by an artificial intelligence, AI, trust engine associated to a network comprising:
receiving, by the AI trust engine via a first interface, information in relation to an AI quality of trustworthiness from a policy manager associated to the network, wherein an AI pipeline orchestrator associated to the network receives, via a second interface, information in relation to an AI quality of service from the policy manager; and
communicating with the AI pipeline orchestrator via a third interface established between the AI trust engine and the AI pipeline orchestrator to realize the AI quality of trustworthiness based on the AI quality of service.

2. The method according to claim 1,
wherein the communicating comprises
issuing, via the third interface, a feasibility discovery request to the AI pipeline orchestrator to discover resource capabilities of a part of the network on which a cognitive network function, CNF, or an AI Pipeline is realized in order to realize the AI quality of trustworthiness of the CNF or the AI pipeline.

3. The method according to claim 2,
wherein the feasibility discovery request comprises at least one of the following elements:
a scope element, indicating for which CNF or AI pipeline instances phase a feasibility discovery is requested for,
a phase element, indicating for which CNF or AI pipeline instances phase a feasibility discovery is requested for,
a technique/algorithm element, indicating for which technique and/or algorithm and/or method a feasibility is to be checked,
a parameters element, indicating for which parameters of a technique and/or an algorithm a feasibility is to be checked, and
a network entity element, indicating for which network entity or function in the network a feasibility is to be checked.

4. The method according to claim 1,
wherein the communicating comprises
issuing, via the third interface, a feasibility update subscription to the AI pipeline orchestrator to be notified about an update in resource capabilities of a part of the network on which a cognitive network function, CNF, or an AI Pipeline is realized in order to realize the AI quality of trustworthiness of the CNF or the AI pipeline.

5. The method according to claim 4,
wherein the feasibility update subscription comprises at least one of the following elements:
a scope element, indicating for which CNF or AI pipeline instances a feasibility update for realizing the AI quality of trustworthiness is requested,
a phase element, indicating for which CNF or AI pipeline instances phase a feasibility update for realizing the AI quality of trustworthiness is requested,
a technique/algorithm element, indicating to which technique and/or algorithm and/or method a feasibility update is to refer,
a parameters element, indicating for which parameters of a technique and/or an algorithm a feasibility update is to be checked, the parameters element including threshold settings for notifying about an update, and
a network entity element, indicating for which network entity or function in the network a feasibility update is to be checked.

6. The method according to claim 2,
wherein the communicating is based on
deriving at least one combination of settings to be implemented at the part of the network on which the CNF or the AI Pipeline is realized in order to realize the AI quality of trustworthiness of the CNF or the AI pipeline based on the satisfying quality of trustworthiness requirements associated with the AI quality of trustworthiness; and
assigning priorities to the at least one combination of settings, wherein the communicating further comprises
issuing the feasibility discovery request and/or the feasibility update subscription for the at least one combination of settings based on the assigned priorities,
wherein optionally the assigning of the priorities is further based on
obtaining trustworthiness threshold value information indicating whether the AI quality of trustworthiness is negotiable and to what extent, and
assigning the priorities by taking the trustworthiness threshold value information into account.

7. The method according to claim 2,
wherein the communicating comprises,
obtaining resource capability information, indicating, for a combination of settings out of at least one combination of settings, resource capabilities and/or updated resource capabilities required at the part of the network on which the CNF or the AI Pipeline is realized for implementation of the combination of settings in order to realize the AI quality of trustworthiness of the CNF or the AI pipeline, and
wherein the communicating leads to
selecting from the at least one combination of settings, wherein the at least one combination of settings are assigned different priorities by the AI trust engine, the combination of settings with highest priority;
generating configuration information indicative of configuration information for implementation of the selected combination of settings and associated resource capabilities and/or updated resource capabilities at the part of the network on which the CNF or the AI Pipeline is realized;
providing the configuration information towards the CNF or the AI pipeline; and
obtaining feasibility information from the CNF or the AI pipeline, indicating whether the selected one combination of settings is feasible with respect to the configuration information.

8. The method according to claim 7,
wherein the selecting comprises performing a trade-off, wherein the performing of the trade-off comprises
evaluating whether a combination of settings and its associated required resource capabilities is acceptable or not, by comparing the associated required network capabilities to a predetermined network capability acceptability threshold value; and
selecting the combination of settings with highest priority from among combinations of settings evaluated as being acceptable.

9. The method according to claim 8,
wherein the evaluating further comprises
evaluating whether a combination of settings and its associated required resource capabilities is acceptable or not, by further taking into account whether the AI quality of service associated with a service requested by a user is negotiable in relation to the AI quality of trustworthiness and to what extent.

10. The method according to claim 7,
wherein, if the feasibility information indicate that the selected one combination of settings is not feasible,
the communicating further leads to
repeating the selecting, the generating and the providing in descending order of priority for another combination of settings out of the at least one combination of settings until the feasibility information indicate that the selected another combination of settings is feasible,
wherein, if no combination of settings out of the at least one combination of settings is feasible,
the communicating further leads to
reporting to the policy manager that the AI quality of trustworthiness is not met, and/or
   reporting to the network operator operating the network that the AI quality of trustworthiness is not met,
and/or
   causing a user requesting a service associated to the AI quality of service to be informed about updates in the user's requested service.

11. The method according to claim 1,
wherein
   the AI quality of trustworthiness is associated with trustworthiness level requirements; and
   the trustworthiness requirements to be satisfied in order to realize the AI quality of trustworthiness are requirements on fairness, explainability and robustness.

12. A method, executable by an artificial intelligence, AI, pipeline orchestrator associated to a network, comprising:
   receiving, by the AI pipeline orchestrator information in relation to an AI quality of service from a policy manager associated to the network, wherein an AI trust engine associated to the network receives, via a first interface, information in relation to an AI quality of trustworthiness from the policy manager; and
   communicating with the AI trust engine via an interface established between the AI pipeline orchestrator and the AI trust engine to realize the AI quality of trustworthiness based on the AI quality of service.

13. The method according to claim 12,
wherein the communicating comprises
   responding, via the third interface, to a feasibility discovery request issued from the AI trust engine by issuing a feasibility discovery response to the AI trust engine,
   wherein the feasibility discovery response is indicative of resource capabilities of a part of the network on which a cognitive network function, CNF, or an AI Pipeline is realized in order to realize the AI quality of trustworthiness of the CNF or the AI pipeline.

14. The method according to claim 13,
wherein the feasibility discovery response comprises at least one of the following elements:
   a scope element, indicating which CNF or AI pipeline instances a feasibility discovery is provided for,
   a supported technique/algorithm element, indicating which AI Trustworthy Artificial Intelligence, TAI, technique and/or algorithm and/or method is supported by the CNF or AI pipeline,
   a cost element, wherein the cost element is related to a usage of resource capabilities of the part of the network on which the CNF or the AI Pipeline is realized in order to realize the AI quality of trustworthiness of the CNF or the AI pipeline,
   the cost element comprising at least one of cost for phase info, type, time granularity and space granularity, indicating which cost is associated with to realization of a technique and/or an algorithm and/or a method, and
   an additional information element, indicating a free text description of feasibility information.

15. The method according to claim 12,
wherein the communicating comprises
   based on a feasibility update subscription issued from the AI trust engine, issuing, via the third interface, a feasibility update notification to the AI trust engine,
   wherein the feasibility update notification is indicative of an update in resource capabilities of a part of the network on which a cognitive network function, CNF, or an AI Pipeline is realized in order to realize the AI quality of trustworthiness of the CNF or the AI pipeline.

16. The method according to claim 15,
wherein the feasibility update notification comprises at least one of the following elements
   a scope element, indicating for which CNF or AI pipeline instances a feasibility update is provided for,
   a supported technique/algorithm update element, indicating an updated list of AI Trustworthy Artificial Intelligence, TAI, techniques and/or algorithms and/or methods that are supported by the CNF or AI pipeline,
   an updated cost element, wherein the cost element is related to a usage of resource capabilities of the part of the network on which the CNF or the AI Pipeline is realized in order to realize the AI quality of trustworthiness of the CNF or the AI pipeline,
   the updated cost element comprising at least one of updated cost for phase info, type, time granularity and space granularity, indicating updates in a cost associated to a realization of a technique and/or an algorithm and/or a method, and
   an additional information element, indicating free text description of updated feasibility information.

17. The method according to claim 14, wherein
   the phase info indicate that the required resource capabilities refer to at least one of training resource capabilities, inference resource capabilities and data source resource capabilities;
   the type indicates that the required resource capabilities refer to estimated resource capabilities or guaranteed resource capabilities,
   wherein the estimated resource capabilities are calculated based on resource capabilities available at the part of the network on which the CNF or the AI Pipeline is realized in order to realize the AI quality of trustworthiness of the CNF or the AI pipeline and are subject of changes, and
   wherein the guaranteed resource capabilities are not subject of change within a predetermined time window;
   the time granularity indicates at least one of
   a time window for which the required resource capabilities are estimated or guaranteed,
and
   a start time after which the required resource capabilities are estimated or guaranteed; and
   the space granularity indicates at least one of
   the required resource capabilities for a specific technology and/or radio network and/or administrative, and
   the required resource capabilities for a specific network entity or function.

18. The method according to claim 14,
wherein the communicating is based on
continuously acquiring network resource capability information regarding the resource capabilities of the part of the network on which the CNF or the AI Pipeline is realized in order to realize the AI quality of trustworthiness of the CNF or AI pipeline,
wherein the feasibility discovery response and/or the feasibility update notification is based on
calculating resource capabilities required at the part of the network on which the CNF or the AI Pipeline is realized for implementation of a combination of settings in order to realize the AI quality of trustworthiness of the CNF or the AI pipeline, based on the continuously acquired network resource capability information, wherein the combination of settings is indicated by the feasibility discovery request and/or the feasibility update subscription.

19. The method according to claim 18, wherein the communicating further comprises obtaining negotiation information indicating whether the AI quality of service associated with a service requested by a user is negotiable in relation to the AI quality of trustworthiness and to what extent, wherein the calculating further comprises, calculating the required resource capabilities based on taking the negotiation information into account.

\* \* \* \* \*